(12) United States Patent
Crane et al.

(10) Patent No.: US 12,377,467 B2
(45) Date of Patent: Aug. 5, 2025

(54) SPATIAL CONTROL OF MATERIAL PROPERTIES IN ADDITIVE MANUFACTURING

(71) Applicant: Brigham Young University (BYU), Provo, UT (US)

(72) Inventors: Nathan Brad Crane, Springville, UT (US); Tracy Wendell Nelson, Springville, UT (US)

(73) Assignee: Brigham Young University, Provo, UT (US)

( * ) Notice: Subject to any disclaimer, the term of this patent is extended or adjusted under 35 U.S.C. 154(b) by 821 days.

(21) Appl. No.: 17/310,544

(22) PCT Filed: Apr. 24, 2020

(86) PCT No.: PCT/US2020/029839
§ 371 (c)(1),
(2) Date: Aug. 10, 2021

(87) PCT Pub. No.: WO2020/223124
PCT Pub. Date: Nov. 5, 2020

(65) Prior Publication Data
US 2022/0062996 A1 Mar. 3, 2022

Related U.S. Application Data

(60) Provisional application No. 62/841,090, filed on Apr. 30, 2019.

(51) Int. Cl.
*B22F 10/50* (2021.01)
*B22F 10/28* (2021.01)
(Continued)

(52) U.S. Cl.
CPC ............ *B22F 10/50* (2021.01); *B22F 10/28* (2021.01); *B22F 12/00* (2021.01); *B28B 1/001* (2013.01);
(Continued)

(58) Field of Classification Search
None
See application file for complete search history.

(56) References Cited

U.S. PATENT DOCUMENTS

2011/0291331 A1* 12/2011 Scott ................. B29C 64/153
264/510
2014/0314613 A1 10/2014 Hopkinson et al.
(Continued)

OTHER PUBLICATIONS

International Search Report and Written Opinion for PCT Application No. PCT/US2020/029839 mailed Jul. 2, 2020, 7 pages.

*Primary Examiner* — Ricardo D Morales
(74) *Attorney, Agent, or Firm* — Brake Hughes Bellermann LLP (57) ABSTRACT

In a general aspect, a method for additive manufacturing can include depositing a liquid on a first portion of an article, the liquid containing a dopant, the article including a feedstock material. The method can also include heating, at a first temperature, the article to, at least one of, evaporate or decompose the liquid. The heating at the first temperature can leave the dopant on the first portion of the article. The method can further include heating, at a second temperature, the article. The heating at the second temperature can result in the feedstock material melting and the dopant mixing with the feedstock material in a second portion of the article. The second portion of the article can include the first portion of the article.

21 Claims, 4 Drawing Sheets

(51) Int. Cl.
  *B22F 12/00* (2021.01)
  *B28B 1/00* (2006.01)
  *B29C 64/153* (2017.01)
  *B29C 64/188* (2017.01)
  *B29C 64/364* (2017.01)
  *B33Y 10/00* (2015.01)
  *B33Y 30/00* (2015.01)
  *B33Y 40/00* (2020.01)

(52) U.S. Cl.
  CPC .......... *B29C 64/153* (2017.08); *B29C 64/188* (2017.08); *B29C 64/364* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2017/0021418 A1 | 1/2017 | Ng et al. | |
| 2017/0057164 A1 | 3/2017 | Hemphill et al. | |
| 2017/0326816 A1* | 11/2017 | Seepersad | B29C 64/291 |
| 2019/0039294 A1* | 2/2019 | Stasiak | B29C 64/165 |
| 2020/0016657 A1* | 1/2020 | Hart | B22F 10/20 |
| 2020/0361143 A1* | 11/2020 | Veis | B29C 64/165 |

* cited by examiner

SPATIAL CONTROL OF MATERIAL PROPERTIES IN ADDITIVE MANUFACTURING

CROSS-REFERENCE TO RELATED APPLICATION

This application is a 35 U.S.C. § 371 National Phase Entry Application from PCT Application No. PCT/US2020/029839, filed on Apr. 24, 2020, entitled "SPATIAL CONTROL OF MATERIAL PROPERTIES IN ADDITIVE MANUFACTURING", and designating the U.S., which claims benefit under 35 U.S.C. § 119 of U.S. Provisional Patent Application No. 62/841,090, filed on Apr. 30, 2019, entitled "Method for Spatially Tailoring Properties in Laser Powder Bed Fusion by Local Composition Control and Applications Thereof", the disclosures of which are incorporated by reference herein in their entireties.

TECHNICAL FIELD

This disclosure relates to additive manufacturing, which can also be referred to as three-dimensional (3D) printing. More specifically, this disclosure relates to approached for spatially (locally) changing (tailoring, modifying, adjusting, etc.) material properties in a part produced using additive manufacturing.

BACKGROUND

Additive Manufacturing (AM), or three-dimensional (3D) printing, can be used to produce a part directly from a digital model. AM can be used to produce such parts without the use of any tooling, part-specific or otherwise. The ability of AM to produce parts without tooling, provides unique capabilities to fabricate (produce, manufacture, etc.) parts having complex geometries that would not be possible to produce using traditional approaches (e.g., tooling, casting, molding, etc.). In addition to the capability to fabricate parts with complex geometries, AM provides the ability to produce integrated parts, in which multiple parts produced using traditional approaches are combined into a single part (component, assembly, etc.) Such integrated parts can result in improved performance of the integrated parts as compared to corresponding multi-part assemblies, can have reduced weight, and/or can also have reduced cost. AM can also shorten lead time (e.g., time from part design to production of a finished part), and can also allow for on-demand fabrication, e.g., at a point of use, which can simplify logistical challenges in maintaining readiness, such as in manufacturing and/or industrial applications.

However, in some implementations, producing parts using AM can have certain drawbacks as compared to approaches for producing like parts using traditional methods. For instance, build rates for parts produced using AM can be slower and, as a result, more expensive than producing parts using traditional methods like casting, forging, and machining, particularly for parts with uncomplex geometries (e.g., a simple gear, etc.). Additionally, material properties of AM-fabricated parts (AM parts) can be inferior to material properties of wrought components produced using traditional methods. For instance, materials of an AM part can have inferior material strength, e.g. fracture toughness or resistance, as compared to a corresponding part produced using traditional approaches. Such effects on mechanical (material) properties in AM parts can be related to adverse changes in microstructure (coarser grains, columnar vs. equiaxed grains) and/or increased defect density resulting from the corresponding AM process.

As some examples, AM can be used to produce AM parts (e.g., articles, parts, components, etc.) for a number of industries, such as aerospace, architecture, electronics, automotive, defense, food service and medical. For instance, AM can be used to produce jet engine turbines, medical devices (such as artificial heart valves, surgical tools, etc.), filters, heat exchangers, catalysts supports, automotive parts, circuit components (such as circuit boards, ceramic substrates, etc.), as well as any number of other parts with varying levels of geometric complexities for the industries noted above, or for other industries.

Current approaches for improving material properties of AM parts can require additional equipment and time for post processing. Such approaches can include heat treatments and hot isostatic pressing which increases cost and processing time. Additionally, because AM forms the material of a part point by point and/or thin layer by thin layer, the processing parameters can be varied spatially. Such variation of processing parameters can alter local cooling rates and, as a result, affect a resulting AM part's microstructure and alter residual stresses.

While use of such post-processing and parameter various approaches can achieve some improvement in material properties of AM parts, some material properties, such as fatigue performance or corrosion resistance, may not be improved due to limitations and/or process constraints.

SUMMARY

In a general aspect, a method for additive manufacturing can include depositing a liquid on a first portion of an article, the liquid containing a dopant, the article including a feedstock material. The method can also include heating, at a first temperature, the article to, at least one of, evaporate or decompose the liquid and/or decompose a residual component left behind after evaporation the liquid. The heating at the first temperature can leaving the dopant on the first portion of the article. The method can further include heating, at a second temperature, the article. The heating at the second temperature can result in the feedstock material melting and the dopant mixing with the feedstock material in a second portion of the article. The second portion of the article can include the first portion of the article.

In another general aspect, a method for additive manufacturing can include depositing a liquid on a first portion of an article, the liquid containing a dopant, the article including a feedstock material. The method can also include heating the first portion of the article with a projected thermal image to, at least one of, evaporate or decompose the liquid. The projected thermal image can have a range of temperatures between a first temperature and a second temperature. The heating (e.g., spatial pattern heating) of the first portion of the article can result in a graded concentration of the dopant in the first portion of the article. The method can further include heating, at a third temperature, the article. The heating at the third temperature can result in a portion of the feedstock material melting and the dopant mixing with the portion of the feedstock material in a second portion of the article. The second portion of the article can include the first portion of the article.

In another general aspect, an additive manufacturing system can include a build chamber configured to receive feedstock material used to produce an article. The system can also include a feedstock material source configured to provide the feedstock material to the build chamber. The system can further include a dopant printing system configured to selectively deposit a dopant containing liquid on the article during manufacturing. The system can also include a first heat source configured to, at least one of, evaporate or decompose the dopant containing liquid, such that the dopant remains on the article in a pattern corresponding with the selective deposition. The system can still further include a second heat source, configured to melt a portion of the feedstock material, such that the dopant is locally dispersed in the article.

BRIEF DESCRIPTION OF THE DRAWINGS

Like reference symbols in the various drawings indicate like and/or similar elements. The drawings are for purposes of illustration and may not necessarily be to scale. Also, in some views, one or more features of an implementation may be obscured or omitted.

DETAILED DESCRIPTION

While advancements have been made to narrow the performance gap between material properties of parts produced using additive manufacturing (AM) and parts that are produced using traditional methods (e.g., tooling, casting, molding, etc.), there are still drawbacks related to material properties for parts produced using AM (AM parts), such as those noted above. This disclosure relates to approaches for spatially (locally, etc.) varying (changing, adjusting, modifying, etc.) material properties for AM parts, which can further enhance mechanical, corrosion, wear, thermal, and other performance characteristics of AM parts as compared to parts produced using traditional processing methods. Briefly, the approaches described herein include the use of locally applied (patterned deposition) of dopants, such as alloying materials, strengtheners, grain nucleating agents, corrosion resistance materials, sintering aids, and/or damping materials, as some examples. For purposes of clarity, such locally applied materials can be referred to herein, collectively, as dopants. The particular dopant (or dopants) used will depend on the specific implementation.

In the disclosed approaches, locally applied (patterned) dopants can, e.g., during a melt (material fusing, etc.) process be locally incorporated (dispersed) in an AM part being produced, where the melt process is used to form a portion (layer, slice, etc.) of the AM part. Therefore, the approaches described herein can be used to improve material properties of AM parts by locally (spatially) varying material composition within an AM part.

This disclosure, by way of illustration and example, generally discusses approaches for spatially tailoring (locally modifying, etc.) material properties in AM parts in the context of producing metal parts using laser Power Bed Fusion (PBF) AM processes. It will be appreciated, however, that such approaches may also be used in connection with other AM processes. Further, the approaches described herein may also be used in connection with producing AM parts using other materials, such as ceramics, polymers, and so forth.

Following is a brief summary of metal AM process in which the disclosed approaches can be implemented. A more detailed discussion of approaches for locally tailoring material properties of AM parts in the context of PBF processes follows this brief summary.

In Directed Energy Deposition (DED) AM processes, material for inclusion in a part can be added to a molten weld pool. Such material can be added as blown powder or wire. An energy source (e.g., a laser) can be moved (scanned, etc.) over the surface of the part to add the desired material to the part. Such DED processes can allow for deposition on existing parts, such as for repairing defects and/or damage. Prior work with DED processes have been directed at achieving large-scale material composition changes, though the approaches described herein could be used to achieve local tailoring of material properties.

In Binder Jetting (BJ) AM processes, a binder is deposited into a cross-section of a part being produced. The binder glues the powder to form a green part. For instance, the binder can be deposited in a powder bed layer (powder feedstock layer, powder layer, etc.). This process can be repeated on successively formed powder layers to form a complete green part layer-by-layer. A completed green part can then be used as a mold/core for casting, or can be post-processed by infiltration or sintering to form a final part. Such processes can have high build rates, but post processing can be time intensive and final material properties can be inferior to material properties of AM parts produced using other AM processes.

Using approaches described herein, BJ processes can allow for producing AM parts with local variation in composition by selectively adding materials (one or more dopants) to the binder. The dopants could then be locally incorporated (diffused, dispersed, distributed, etc.) into the final part AM during post processing. In prior approached, dopants have been printed into BJ powder beds to tailor material performance. However, such approaches have not achieved large gradients in composition. Successful binding in BJ processes generally requires a continuous region of bound powder. However, when dopant levels are varied, the dopant tends to flow from regions of high saturation to low saturation, thus reducing the composition gradient significantly. The use of spatial variation in temperature, as disclosed herein, may allow for control over composition gradients, while maintaining continuous moistened (bound) powder.

In Powder Bed Fusion (PBF) processes, an energy beam (e.g., a laser, and electron-beam, etc.) can be scanned over a layer of powder (powder bed layer, metal power layer, etc.) to selectively fuse powder feedstock material of successive powder layers to form (layer-by-layer) an AM part based on, e.g., a three-dimensional (3D) model. PBF processes are capable of high scan speeds (e.g., >1 meter/second), and also allow for (are capable of, etc.) fabricating fine features in an AM part. In PBF processes, unfused powder (e.g., portions of a powder bed not incorporated in the AM part being produced) can provide support (e.g., physical support) for fused feedstock material that is included in an AM part being produced (e.g., within an AM build chamber).

In PBF processes, successive layers of powder feedstock are formed (e.g., within a build chamber), where each layer is selectively fused (e.g., based on a corresponding 3D model) by an energy beam (e.g., laser, electron beam, etc.) that is scanned over the powder layer surface prior to forming a next powder layer. Each successive powder layer can be formed by spreading a pile of powder or by depositing a layer of powder (e.g., in an AM build chamber), where the powder can then be smoothed by a roller (e.g., a counter-rotating roller) or a blade (e.g., a coater blade).

Such PBF processes are, however, not easily adapted to produce AM parts (e.g., metal AM parts) from multiple feedstock (e.g., metal powder) materials. While spatial variation of material properties in an AM part produced using PBF can be achieved using different feedstock materials (e.g., by in-situ patterned deposition of different powder feedstock material, removal and replacement of powder feedstock, use of filaments of different materials, etc.), such approaches have a number of drawbacks. For instance, such methods complicate and slow the powder layer deposition process and, as a result, slow the build rate for an associated AM part. Additionally, such approaches can prevent recycling of powder feedstock due to mixing of materials during AM processing, which can increase overall cost for AM parts produced using such approaches.

Using the approaches described herein, significant changes in material properties of AM parts (and associated mechanical performance) can be achieved by spatially (locally) changing material composition using targeted alloying elements. Such approaches can overcome, at least in part, the drawbacks of using multiple powder feedstock materials (e.g., material mixing, build rate, etc.), and can also reduce introduction of unwanted material phases that can have deleterious impacts on an AM part, such as promoting brittle fracture.

Using the approaches described herein to spatially tailor and improve material properties in AM parts can provide for broader application of AM processes in producing mechanically critical components. Further, the ability to locally tailor material properties of an AM part using the approaches described herein can reduce lead-time for producing a usable part due, at least in part, to associated improvements in mechanical performance. For instance, such local tailoring of material properties can be used in problematic areas of an AM part, such as regions of the part that experience high stress concentrations. Locally tailoring of material properties in such regions (areas, portions, etc.) of an AM part could significantly improve damage tolerance, as well as reduce lead time and manufacturing cost, e.g., by eliminating costly post-AM processing, such as hot isostatic pressing, heat treatment processes and/or surface treatments.

Figure 1:
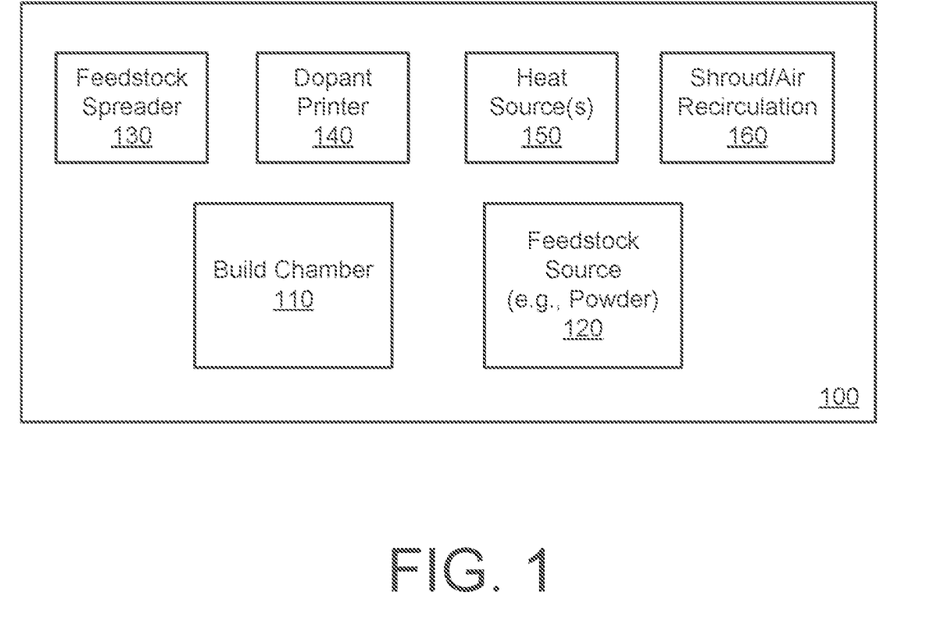
FIG. 1 is a block diagram that schematically illustrates an additive manufacturing system.

FIG. 1 is a block diagram that schematically illustrates an additive manufacturing system 100. The system 100 can be used to implement an AM manufacturing process, such as the processes described herein (e.g., PBF processes, DED processes, BJ process, etc.). The system 100 of FIG. 1 includes a build chamber 110, a feedstock source (e.g., feedstock powder source) 120, a feedstock spreader 130, a dopant printer 140, one or more heat sources 150 and a shroud/air recirculation component 160. The system 100 is given by way of example as a system in which local (spatial) tailoring (modification, etc.) of material properties can be achieved on an AM part. Systems having other configurations can, of course, be used to implement the approaches described herein.

In the system 100, the build chamber 110 can be configured to hold (house, contain, etc.) an AM part being produced by the system 100. The feedstock source 120 can be configured to provide feedstock material, such as metal powder, ceramic powder, polymer powder, etc. to the build chamber 110. For instance, in some implementations, the feedstock source 120 could be a chamber (reservoir, etc.) that is disposed adjacent to, and side-by-side with the build chamber 110. In some implementations, the feedstock source 120 can be disposed above the build chamber 110 and deposit feedstock powder into the build chamber from above. In some implementations, the feedstock source 120 can move relative to the build chamber 110. For instance, in such implementations, the feedstock source 120 can placed in one position to provide feedstock powder to the build chamber 110, and placed in another position during other operations of an AM process.

The feedstock spreader 130 can be configured to spread and/or pack layer of feedstock powder layers in the build chamber 110, e.g., after feedstock powder is provided from the feedstock source 120, or as part of providing feedstock powder from the feedstock source 120. In some implementations the feedstock spreader 130 can include a coater blade and/or a counter-rotating roller, as some examples.

The dopant printer 140 can be configured to deposit one or more dopant containing liquids onto an AM part being produced in the build chamber 110 of the system 100. In some implementations, the dopant printer 140 can include an inkjet print head, syringe pumps, aerosoljets, and/or spray nozzles, as some examples. The particular approach for depositing dopants will depend, at least in part, on the dopant being deposited (printed).

In some implementations, the dopant printer 140 can operate in conjunction with a motion system to deposit (print) dopant containing liquid(s) (which can be referred to herein as ink or inks) onto an AM part being produced. The dopant liquid(s) can be selectively deposited based on a 3D model of the AM part being built, and, in particular, deposited at locations where material properties of the AM part are to be locally modified (spatially tailored) by incorporating (alloying, diffusing, dispersing, etc.) the dopant(s) in the feedstock material (e.g., during a melt operation of a corresponding AM process).

Heat source(s) 150 can include a first heat source that is configured to evaporate and/or decompose the dopant containing liquid, so that the dopant remains on a previously fused portion of the AM part, and/or disposed in pores of feedstock powder layer of the AM part being produced. The heat sources(s) 150 can also include a second heat source that is configured to be scanned over the AM part being produced to selectively fuse the feedstock material to build (e.g., print) the corresponding AM part, which can be referred to as melt operation. In localized regions where dopant(s) are presented, the melt operation can also locally disperse those dopants in the fused feedstock material, where the dopants can locally (spatially, etc.) alter the material properties by alloying and/or combining with the fused feedstock material. Examples of such heat sources are described below.

In some implementations, evaporation and decomposition can be performed separately. For instance, a first heating step can be performed (e.g., a first temperature) to evaporate a liquid to leave a dopant precursor that is included in a liquid, and a second heating step can be performed (e.g., at a second, different temperature) to decompose the dopant precursor left behind after the evaporation process. In some implementations, additional heat sources can be used for evaporation and decomposition. After evaporation and decomposition, a melt process, such as described herein, can be performed. In some implementations, the printed liquid instead of evaporating and/or decomposing, can, after heating, solidify as that region of the AM part cools. For instance, the liquid can be cured (to a solid state) by heating and then cooling.

The shroud/air recirculation component 160 can remove evaporated portions of dopant containing liquid(s) (e.g., decomposition byproducts) from the build chamber 110, e.g., when a heat source (e.g., first heat source) is used to evaporate and/or decompose the deposited liquid(s). In some implementations, this removal can prevent contamination of the feedstock powder (both unused feedstock powder in the build chamber 110, as well as feedstock powder in the feedstock source 120), which can allow for reuse (recycling) of feedstock powder and, therefore, reduce overall AM costs for parts produced with the system 100.

Figure 2:
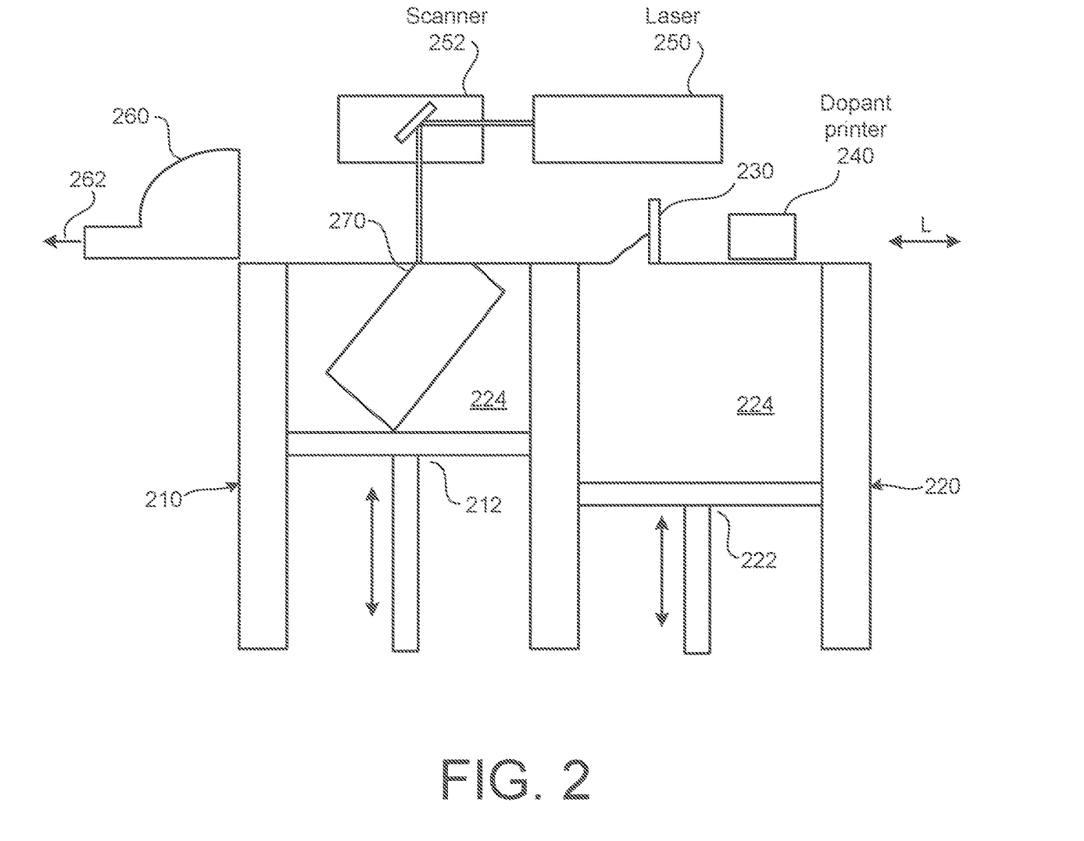
FIG. 2 is a diagram that schematically illustrates a laser powder bed fusion additive manufacturing system.

FIG. 2 is a diagram that schematically illustrates a laser powder bed fusion (PBF) AM system 200. In some implementations, the system 100 of FIG. 1 can be implemented by the system 200 of FIG. 2. The system 200 of FIG. 2, similar to the system 100, includes a build chamber 210, a feedstock source (e.g., feedstock powder source) 220, a feedstock spreader 230, a dopant printer 240, a laser heat source 250, a scanner 252, and a shroud/air recirculation component 260. The system 200 is given by way of example as a system in which local (spatial) tailoring (modification, etc.) of material properties can be achieved on an AM part. Systems having other configurations can, of course, be used to implement the approaches described herein.

In the system 200, as with the build chamber 110, the build chamber 210 can be configured to hold (house, contain, etc.) an AM part 270 being produced by the system 200. As shown in FIG. 2, the build chamber 210 also includes a piston 212 that can move vertically (e.g., downward to lower the part 270 into the build chamber 210 to facilitate forming each successive feedstock powder layer, and upward to move the part 270 out of the build chamber 210, e.g., when completed). The feedstock source 220 can be configured to provide feedstock material, such as metal powder, ceramic powder, polymer powder, etc. to the build chamber 210. In this example implementation, the feedstock source 220 includes a reservoir of feedstock powder 224. The feedstock source 220 is disposed adjacent to, and side-by-side with the build chamber 210.

In some implementations, the build chamber 210 can be heated in order to facilitate evaporation and/or decomposition of dopant containing liquids. In some implementations, the laser 250 and scanner 252 can be used, alone or in combination with heat from the build chamber 210, to facilitate evaporation and/or decomposition of dopant containing liquids.

Figure 3:
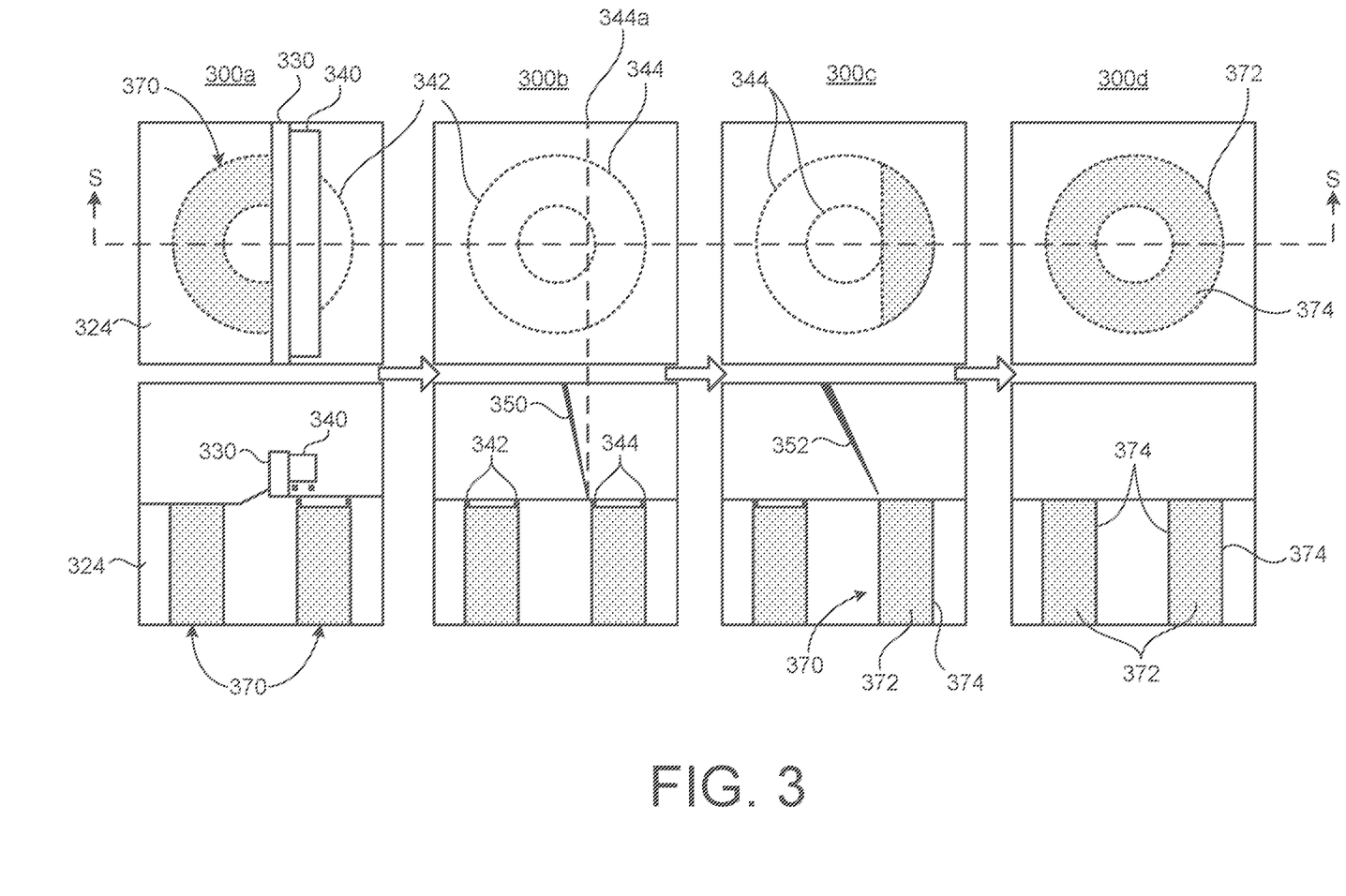
FIG. 3 is a series of diagrams illustrating a process for locally tailoring (modifying, controlling, etc.) material properties of portions of a part produced using additive manufacturing.

The feedstock spreader 230 (e.g., a coater blade in this implementation), as shown, which can be configured to spread and/or pack layer of feedstock powder in the build chamber 210 from the feedstock source 220, such as shown in FIG. 2. In the system 200, the feedstock source 220 includes a piston 222 that can move vertically (e.g., upward to push feedstock powder out of the reservoir to be spread in the build chamber 210, and downward to provide additional volume in the reservoir for feedstock powder 224). System 200 also includes a dopant printer 240 that, in the system 200 can move independently of the feedstock spreader 230, though in some implementations, such as shown in FIG. 3, the feedstock spreader 230 and the dopant printer 240 can be configured to move together (e.g., can be coupled together). In the system 200, the feedstock spreader 230 and the dopant printer 240 can move laterally along the line L. In some implementations, the feedstock spreader 230 and the dopant printer 240 can move in other directions, and/or can move in different directions from one another.

The laser 250 and scanner 252 (e.g., with the laser operating at a higher power than for evaporating and/or decomposing dopant liquids) can be used to scan the build chamber (e.g., previously fused, and/or unfused feedstock powder, both doped and undoped) to perform a melt (fusing, etc.) operation to form (layer by layer) the part 270. As shown in FIG. the part 270 can be formed in the build chamber 210 within a bed of unfused feedstock powder 224. Portions of the part 270 (previously fused material) and/or unfused feedstock powder 224 in the build chamber that are doped, when scanned by the laser 250 and scanner 252 during a melt operation, can locally disperse the dopants in the part 270 to spatially (locally) alter material properties of the part as compared with pure fused feedstock powder 224. For instance, material properties can be locally changed (altered, modified, tailored, etc.) due to alloying and/or combination of the dopant(s) with fused feedstock powder included in the part 270).

As with the shroud/air recirculation 160 of the system 100, the shroud 260 of the system 200 can be configured to remove evaporation and/or liquid decomposition byproducts 262 from the build chamber 210, e.g., to maintain an inert environment for producing the part 270, to prevent contamination of the feedstock powder 224, and/or to prevent hazardous conditions, such as fire resulting from flammable byproducts. In FIG. 2, the shroud 260 is shown next to the build chamber 260. In some implementations, the shroud 260 could be in a different position, such as above the build chamber 210.

Using an AM system, such as the systems 100 and 200, to implement the approaches for locally tailoring material properties of an AM part disclosed herein, small variations in material composition in localized regions of an AM part can be realized. Such implementations can include depositing one or more dopants in respective liquid precursors or carriers. For some dopants, the liquid can be a transport (carrier) for a dopant in solution. For other dopants, the liquid can decompose (when heated) and leave the desired dopant as a residue. For example, such liquids could contain a polymer or other material that decomposes into a carbon residue. Such liquids could also include a metal salt dissolved in a solvent, or an organometallic such as iron pentacarbonyl or nickel carbonyl.

The approaches described herein can be implemented in a wide variety of material systems. For example, in some implementations, simple binary model material systems, such as iron-chromium (FeCr) steel or AlSi 10 Mg aluminum alloy can be used (e.g., as feedstock material). However, as noted above, the approaches described herein can also be extended to a number of other material systems including other metals/alloys, ceramics, and/or polymers.

Two examples of how local tailoring of material properties can be applied are two classes of strengtheners: oxide dispersions, and solution strengtheners, which can enhance mechanical properties in metal alloys. Both of these examples are discussed further below. Briefly, however, such materials are known to increase strength in traditional alloys, and both can have beneficial secondary impacts on the microstructure resulting from the AM process.

Implementations of AM processes using either of the two alloys noted above (FeCr alloy and AlSi 10 Mg alloy) can realize benefits from such local tailoring of material properties. As is discussed further below, localized addition of oxide, carbon and/or nickel to FeCr alloy (e.g., for surface features) can significantly, and beneficially impact post-AM microstructure and material properties of corresponding AM parts. Also, oxide dispersion in Al alloys (e.g., AlSi 10 Mg alloys) can significantly improve strength, and provide crack shielding at low concentrations if it is well dispersed, such as can be locally achieved using the techniques described herein.

In some implementations, solvents for dopant liquids can be selected so as to reduce undesired reactions with feedstock material that is being processed. Using a shroud, such as 160 or 260 of the systems 100 and 200 discussed above, the risk of undesired reactions can be further reduced.

As discussed herein, dopant liquid precursors can be deposited using a variety of technologies, such as syringe pumps, inkjet printheads, aerosoljet deposition systems, and spray nozzles. For instance, dopant liquid precursor materials can be deposited using such technologies, and then scanned and/or heated with a low intensity energy (heat) source to evaporate solvents and/or decompose precursors, depending on the specific implementation, solvent and/or dopant precursor.

Depending on the particular implementation, deposition of a dopant containing liquid can occur at a number of different stages of AM processing. For instance, in some implementations, dopant deposition (in liquid) can be performed on previously fused feedstock material of an AM part. The previously fused and doped portion of the AM part (e.g., after drying and/or decomposition) can then re-melted to incorporate (diffuse, disperse, etc.) the deposited alloying (dopant) materials in the fused feedstock material.

In some implementations, dopant containing liquids can be deposited onto a feedstock powder layer, e.g., after spreading a new powder layer. A laser (e.g., the laser 250) can then be scanned (e.g., after drying and/or decomposition) over the doped (and undoped) feedstock powder material, which can locally incorporate the dopants in fused feedstock material and spatially alter the properties of the fused and doped material included in a corresponding AM part.

In some implementations, dopant liquids can be deposited (and evaporated and/or decomposed) on previously fused material before spreading a new layer of feedstock powder. In such implementations, the dopant(s) can be incorporated when the new layer of feedstock powder is fused. Such approaches can be beneficial in situations where the intense heating by the energy beam during melting (fusing) can cause excessive heating of dopant materials, which could undesirably alter their properties, such as their composition and/or particle size.

As discussed herein, local material property enhancement (spatial tailoring of material properties) can be achieved by locally depositing liquid dopants or solid dopants in a liquid carrier into a feedstock powder bed. In some implementations, such as those described herein, the dopants can be deposited only in specific regions of an AM part where associated changes in material properties are desired. As noted above, various approaches for depositing dopant containing fluids can be used. The particular approaches used can depend, at least in part, on the dopant liquid being deposited.

In some implementations, depositing dopant containing fluids in specific locations can be achieved using inkjet printing technology, which can be used to deposit a wide variety of liquids. Further, inkjet printheads with a large number (e.g., thousands) of nozzles can provide for fast, accurate patterning and deposition of dopant containing liquids. In some implementations, dopant containing liquids can be dispensed (deposited) using syringe pumps. Such approaches may be useful for depositing high viscosity liquids, which can be difficult to deposit using inkjet print heads, and/or in situations where local doping is desired in a contour region around other features of an AM part. As discussed above, when integrated with a motion system, these dopant printing approaches can be used to deposit dopants (in liquids) with precise control over quantity and location, which can facilitate accurate, spatially tailored composition control. Additionally, such techniques (e.g., inkjet printing) can provide for rapid deposition of dopants, so as to reduce impact on processing speed (e.g., build rate).

In some implementations, dopant containing liquid can be deposited uniformly by processes such as spraying and/or by coating a powder bed with a dopant liquid. Such approaches can be effective where it is desired to have only two doping levels: high and low. In such implementations, the dopant could then be patterned by selectively crosslinking and/or curing the dopant, or its liquid carrier in locations where a high level is desired, and rinsing it away in other locations.

It will be appreciated that these, as well as other deposition processes can be used individually or in combination with one another, such as to deposit more than one dopant with varied, respective patterns, so as to achieve more complex variations (distributions) of material properties.

FIG. 3 is a series of diagrams illustrating a process for locally tailoring (modifying, controlling, etc.) material properties of portions of a part 370 produced using additive manufacturing. FIG. 3 illustrates four stages of an AM process used to form one layer of an AM part with locally altered material properties on an outer surface of the AM part and on an inner surface of the AM part. In FIG. 300, these four stages are referenced, respectively, as 300a, 300b, 300c and 300d. For each stage illustrated in FIG. 3, an upper diagram shows a top down view (e.g., from above a build chamber), while a bottom diagram shows a cross-sectional view along the section line S-S corresponding with its respective upper diagram. In some implementations, the process of FIG. 3 can be implemented using an AM system similar to the system 200 of FIG. 2.

As shown in FIG. 3 at stage 300a, a coater blade 330 spreads a layer of feedstock powder 324. In this example, a dopant printer (inkjet printhead) 340 is coupled, and travels with (behind) the coater blade 330 in stage 300a. As shown in FIG. 3, at stage 300a, the dopant printer 340 deposits a liquid dopant precursor 342 in selected areas (e.g., in concentric circle patterns) on the newly spread feedstock powder layer, where the dopant is selected to spatially alter material properties on the outer surface of the AM part 370 being produced. In some implementations, the dopant printer 340 perform more than one dopant deposition step to deposit multiple dopant with respective patterns that can overlap, not overlap, or can be a same pattern.

At stage 300b, in this example implementation, a laser (e.g., a low power laser) 350 is scanned (from right to left) over, at least, the regions printed with the dopant precursor 342 (and any other dopant precursors) to evaporate/decompose the liquid precursor leaving behind a dopant 344 (and another deposited dopants) in the feedstock powder layer. In this example, dashed line 344a in the top and bottom views of stage 300b indicates the right to left scan progress of the laser 350. For instance, to the right of the dashed line 344a, dopant 344 is shown (e.g., after evaporation/decomposition of the precursor 342), while to the left of the dashed line 344a, precursor 342 is shown (e.g., prior to evaporation/decomposition)

In some implementations, evaporation and/or decomposition can be accomplished using other approaches. For instance, such evaporation/decomposition can be accomplished using a projected thermal image, a heat lamp, or by heating gas that is passed over the surface. As noted herein, use of a shroud and/or an inert gas flow can help remove gaseous evaporation/byproducts from the powder bed surface and prevent contamination.

At stage 300c of FIG. 3, a laser (e.g., high power laser) 352 can be scanned over the powder bed surface to fuse the powder feedstock layer. In areas where the dopant 344 is present (or other dopants are present), fusing the feedstock powder layer locally incorporates and disperses (diffuses, distributes, etc.) the dopant 344 (as well as any other dopants) in a local weld pool.

In the example of FIG. 3, the internal and external surfaces of the part 370 would include material 374 with locally altered properties due to the incorporation of the dopant 344 in the fused feedstock material. The internal portions of the part 370 include material 372, which is undoped and, therefore, would not have altered material properties (e.g., material 372 is pure, fused feedstock material). At stage 300d of the FIG. 3, a finished layer of the part 370 is shown, which is ready for repetition of stages 300a through 300c.

Figure 4:
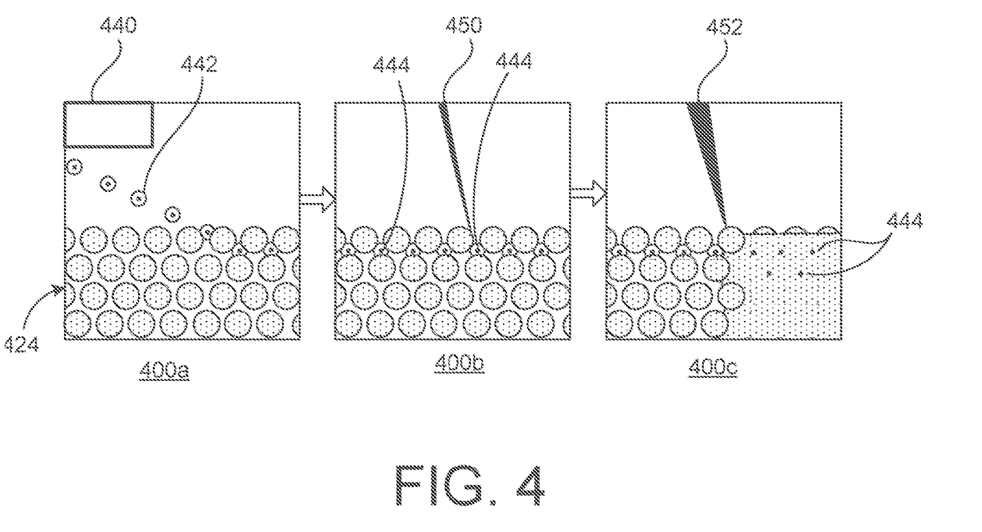
FIG. 4 is a series of diagrams illustrating close up views of operations of the process of FIG. 3.

FIG. 4 is a series of diagrams illustrating close-up, side views of operations of an AM process corresponding with the stages 300a, 300b and 300c of FIG. 3, which are indicated respectively in FIG. 4, as stages 400a, 400b and 400c. As shown at stage 400a, a dopant printer (e.g., inkjet printhead) 440 deposits a desired dopant that is included in a liquid precursor 442 in a layer of feedstock powder is deposited, which infiltrates pores of the layer of feedstock powder. While not specifically discussed with respect to FIG. 4, as was discussed with respect to FIG. 3, multiple dopants can be applied to the layer of feedstock powder, e.g., in respective deposition patterns.

As shown at stage 400b, a laser (e.g., a low power laser) 450 is scanned (from right to left) over, at least, the regions printed with the dopant precursor 442 to evaporate/decompose the liquid precursor leaving behind a dopant 444 in the layer of feedstock powder. At stage 400c of FIG. 4, a laser (e.g., high power laser) 452 is scanned (from right to left) over the powder bed surface to fuse the powder feedstock layer.

As shown at stage 400c, in fused areas where the dopant 444 is present, fusing the feedstock powder layer locally incorporates and disperses (diffuses, distributes, etc.) the dopant 444 in the fused material (e.g., via a local weld pool during the melt operation of stage 400c). For instance, the scanning process with laser 452 at stage 400c locally melts regions of the layer of feedstock powder as the laser is scanned over the surface. Convection within an associated melt pool can then cause local mixing of the dopant 444 within the molten feedstock material (e.g., over a small diffusion distance).

Figure 5:
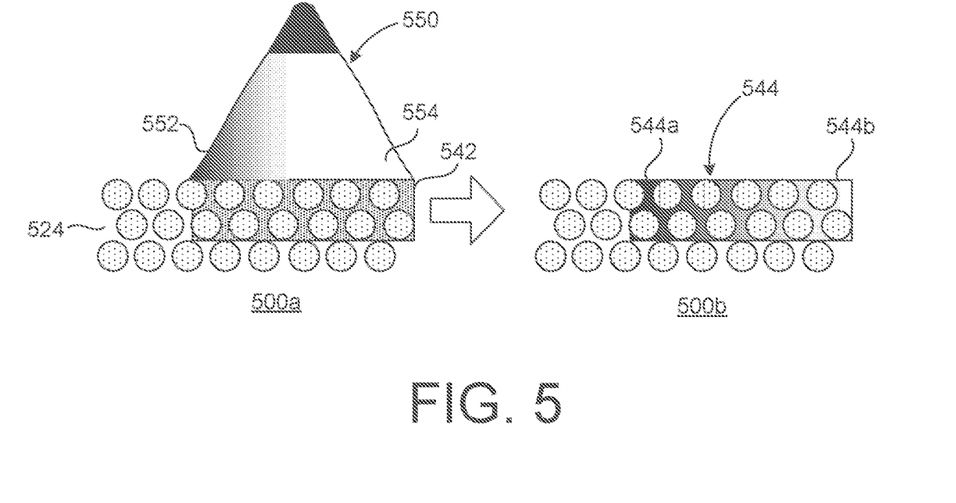
FIG. 5 is a series of diagrams illustrating a process of distributing a dopant from a deposited liquid in a powder bed in an additive manufacturing process.

FIG. 5 is a series of diagrams illustrating a process of distributing a dopant from a deposited liquid in a powder bed in an additive manufacturing process. FIG. 5 illustrates two stages of a dopant deposition process, indicated as stage 500a and stage 500b. As shown by stage 500a of FIG. 5, when initially deposited, a dopant containing liquid (e.g., dopant precursor) 542 can be evenly distributed (locally) in a layer 524 of feedstock powder (e.g., between pores in the feedstock powder layer). In this example, a heat source 550 can be used to project a thermal image on the layer 524 of the feedstock powder. The heat source 550 can be implemented in a number of ways, such as those described herein. As shown in FIG. 5, at stage 500a, the thermal image has a graded intensity with a higher thermal intensity 552 (higher temperature) at the left side, and lower thermal intensity 554 (lower temperature) at the right side.

In some implementations, such uneven (graded) heating can be used to redistribute dopant from or to the regions where lower thermal intensity is applied to regions where higher thermal intensity is applied (e.g., as result of migration of dopant precursor from cooler regions to warmer regions, or from warmer regions to cooler regions). That is, applying gradient thermal energy can result in graded distribution of a dopant 544 in the layer of feedstock powder. As shown at stage 500b of FIG. 5, for this example, a higher dopant concentration 544a of the dopant 544 is present where the higher thermal intensity 552 was applied at stage 500a, while a lower dopant concentration 544b is present where the lower thermal intensity 554 was applied at stage 500a. In some implementations, the dopant concentrations 544a and 544b can be reversed Accordingly, such approaches, by producing a graded doping concentration, can be used to achieve a gradient in local material composition changes, as well as to reach dopant concentration levels in select locations (e.g., AM part surfaces) that are greater than concentrations than can be achieved with a single dopant printing operation.

In some implementations, other approaches can be used to achieve such graded doping concentrations. For instance, a laser (e.g., such as the laser 350 or the laser 450), or other thermal energy source(s) can be repeatedly scanned over, or projected on different regions of an AM part being produced. In such an approach, scan speed, power of a laser, and or intensity of applied thermal energy sources can be varied to create a temperature gradient (or multiple temperature gradients), such as can be created by projecting a thermal image.

In some implementations, a powder feedstock layer can be patterned by printing a radiation (heat) absorber. In such approaches, a substantially uniform energy source or sources (e.g., one or heat lamps or thermal energy sources) can be passed over the powder bed, the print regions can absorb more heat than non-printed region, which can result in graded evaporation of solvent and heating of the powder bed (e.g., powder feedstock layer).

As discussed herein, both decomposition and evaporation of dopant containing liquids (e.g., dopant precursors) can be accomplished by heating. In some implementations, such heating can be controlled in intensity and in spatial distribution to control concentration distribution of associated dopants. For instance, in some implementations, concentration of a dopant through a thickness of a feedstock powder layer can be controlled via a heating rate.

As discussed above, heating for evaporation and/or decomposition could be accomplished by scanning the surface with a laser (e.g., in PBF systems), such as with a laser operating at lower power densities and energy density than a laser used during a melting (fusing) operation. In some implementations, a variable power laser can be used for both evaporation and decomposition of dopant containing liquids. In some implementations, a first laser can be used for melting operations, while a second laser can be used for performing evaporation and/or decomposition. For instance, the second laser could be selected based interactions between the and the dopant containing liquids and/or feedstock powders. For instance, in some implementations, a CO2 laser can be used to achieve improved absorption by the liquid and, accordingly, faster heating.

In some implementations, a heated lamp (e.g., multiple lamps of different heat intensities) or a high intensity projection system could be used to heat and evaporate and/or decompose dopant containing liquids. Such heating sources can be stationary, or they can move over the part. In implementations using a projector, thermal intensity can be varied over time in conjunction with feedback control based on thermal images and/or other feedback on AM part properties.

Slower heating obtained using projectors or lamps can facilitate increased dopant deposition (concentration), e.g., at a surface of a feedstock powder layer, as a result of fluid transport through the porous powder bed supplying fresh dopant containing liquid to the heated regions (or regions with higher thermal intensity applied) as the liquid is more rapidly depleted by evaporation/decomposition in those regions. In some implementations, by controlling the time, temperature, and spatial distribution of the heat, dopants can be concentrated in different regions of an AM part. Such approaches can be used to create local regions, such as exterior surfaces, with higher dopant concentration levels than can be achieved in a liquid carrier.

As discussed herein, maintaining a high temperature in the feedstock powder bed (e.g., in a build chamber) can also be used to provide energy to evaporate/decompose dopant containing liquids. In some implementations, a powder bed with a lower heated temperature can be used in conjunction with another heating method, such as those approached described herein, to achieve desired evaporation and/or decomposition of dopant containing liquids, e.g., without adversely affecting microstructure (e.g., grain size and/or shape) of an associated AM part being produced.

In the approaches described herein, concentration of a dopant in a feedstock powder layer can depend on a concentration of the dopant in a deposited liquid and a packing density of the powder bed on which it is deposited. For instance, a powder bed in AM processes can be packed at a 50-60% density, which can be referred to as the powder bed relative packing density ($f_{pb}$). That is, in an implementation where $f_{pb}$ is 60%, the remaining 40% of the associated feedstock powder layer volume would be porosity.

During printing of dopant precursors, this porosity can be at least partially filled with the printed fluid. The fraction of the pore space filled with the printed fluid can be referred to as saturation(S). A doping level that can be achieved in a single printing would then be a function of the porosity $(1-f_{pb})$ and the concentration of the dopant in the fluid (c). Accordingly, the largest average doping (d) concentration that could be achieved for a dopant containing liquid printed at 100% saturation(s) would be given by Equation 1 below:

$$d = \frac{(1-f_{pb})c}{f_{pb} + (1-f_{pb})c} \quad \text{Equation 1}$$

For the case where $(1-f_{pb})c \ll f_{pb}$, this is approximately given by Equation 2 below:

$$d = \frac{(1-f_{pb})c}{f_{pb}} \quad \text{Equation 2}$$

For a typical case where $f_{pb}$ is approximately 50%, a doping percentage (by volume) is d~c. Accordingly, for a 1-10% solution concentration, the average dopant concentration level with evenly distrusted heating would likely not exceed 10%. However, in some implementations, by drying some regions more slowly than others (e.g., using graded thermal intensity) such that liquid from the more slowly dried regions refills liquid depleted regions (e.g., more rapidly dried regions), dopants can be concentrated (more concentrated) in specific regions to achieve higher local doping levels than given by the equations above. Such approaches can be useful in implementations where it is desired to achieve specific local material properties (e.g., on surfaces of an AM part, such as a surface of a particular feature, or for other specific regions of an AM part. Though in some implementations, printing and drying processes can be repeated multiple times to increase associated dopant concentration levels, and/or to print different dopants (e.g., a second dopant, a third dopant, etc.) to alter different material properties (e.g., in a same region and/or different regions of an AM part).

The approaches for local tailoring of material properties in AM processes discussed above can be employed to achieve different material properties (e.g., in targeted portions) within an AM part. The specific material properties that are tailored, and the location, or locations of that tailoring within the corresponding AM part will depend on the particular implementation (e.g., the AM part, the application of the AM part, the powder feedstock material being used, etc.). Below is a discussion of example applications of the approaches described herein to achieve specific, local changes in material properties. These applications are given by way of example, and numerous other applications for the disclosed approaches for locally varying material composition and material properties in an AM part are possible.

In some implementations, the approaches described herein can be used to locally disperse strengthening agents in an AM part. For instance, an applied dopant can include oxides that are locally dispersed (diffused, distributed, etc.) during an AM melt operation. Such dispersed oxides can serve as strengtheners and crack arrestors in metal AM parts. In such implementations, obtaining adequate dispersion (e.g., local dispersion, local diffusion, diffusion, etc.) of the oxide particles in the metal is important and can be achieved using the approaches describe herein. In some implementations, an oxide concentration (localized concentration) may be <2%. In some implementations, the localized addition of <1% of alumina or ceria nanoparticles into steel alloys can achieve desired strengthening benefits (e.g., in a portion of an AM part that is subject to high stress levels).

While such implementations may not be capable of achieving wholesale composition changes (e.g., 100% iron to 100% nickel), they can provide the capability to tune strength, fracture, and creep properties locally in areas of high stress concentration within a critical component produced using AM, such as using the approaches discussed herein. Using an inkjet printing system for applying a liquid (ink, carrier, transport, etc.) the oxides (dopant) allows for precise and quick doping of a powder bed either before or after spreading a layer of powder feedstock. In such implementations, small quantities of dopants can result in significant improvements in material properties by locally changing material composition in specific portions (areas, regions, etc.) of an AM part.

In some implementations, to reduce agglomeration, dispersed oxides could can be mixed with, or coated by secondary materials including organic dispersants and small amounts of a matrix material. In some implementations, dispersion agents could be produced using in situ reactions. For instance, such production of dispersion agents could be accomplished by depositing carbide formers such as titanium, tungsten, or chromium. Titanium could be deposited as titanium tetrachloride. Chromium could be deposited from chromium trioxide. In some implementations, carbon could be deposited from with the ink (e.g., a liquid deposited using inkjet, or other printing) or produced by reaction with carbon in an alloy of the AM part being produced. In some implementations, carbon (e.g., only carbon) can be deposited to react with alloying elements already in the powder bed feedstock. In such implementations, the ink could include materials such as carbon black, graphite, and/or graphene/graphene oxide.

In some implementations, oxide and/or other high temperature particles can be applied as dopants using the approaches described herein to act as nucleating agents. In such implementations, the nucleating agent can locally alter microstructure of a portion of an AM part. For instance, the nucleating agents can locally alter microstructure in an AM part from columnar grains to equiaxed grains, which can have a significant impact on strength and toughness.

In some implementations, solution strengtheners, or precursors that produce solution strengtheners on heating, can be locally deposited as dopants using the approaches described herein. Use of such solution strengtheners can result in local mechanical property improvements in an AM part. For example, carbon and/or nickel containing compounds could be utilized to locally alter material composition and provide strengthening via solid solution strengthening, or by altering phase fraction and phase morphology during the after solidification of the molten material. In some implementations <0.2% carbon and/or <3% nickel can provide desired local material properties (strengthening) improvements.

In some implementations, dopants that improve corrosion resistance can be locally added to, e.g., increase corrosion resistance of surface features. For instance, the local addition of chromium to surface features of a steel AM part, using the approaches described herein, can increase corrosion resistance of those surface features. Such implementations could benefit from multiple printing and/or localized heating of applied dopant containing liquid to promote higher deposition concentration of the deposited materials in one or more surface region of an AM part (e.g., such as in the example illustrated in FIGS. 3A-3D.) In some implementations, corrosion resistance of hardenable 17-4 stainless steel could be enhanced by locally adding nickel in select (e.g., surface) regions of an AM part.

In some implementations, doping powder feedstock layers with a material such as chromium and/or nickel can locally increase corrosion resistance. For instance, such approaches can reduce corrosion on the locally modified materials (e.g., surfaces), without the expense and/or reduced mechanical performance that can result from using only (e.g., 100%) corrosion resistant material to produce an AM part. Such implementations can useful for producing parts for applications from the food manufacturing industry to naval applications, e.g., applications where surface corrosion resistance can be critical.

There are a number of applications where AM parts with locally improved corrosion resistance can also benefit from locally changing surface hardness (e.g., in the same portions, or different portion of the same AM part). Using the approaches described herein, material properties of and AM part (e.g., surface features) can be locally be tailored to enhance both corrosion resistance (e.g., as described above) and surface hardness (e.g., as described below).

In some implementations, dopants that enhance (improve, increase, etc.) surface harness can be locally incorporated in an AM part using the approaches described herein. For example, a deposited dopant material could be selected (e.g., based on the power bed feedstock material being used) to change surface tension of the material in which the selected dopant is incorporated. In such an approach, the selected dopant can locally alter a direction of circulation of molten metals (e.g., during a melt operation of an AM process). This altered direction of circulation can, in turn, change the shape of an associated weld pool. The altered weld pool can result in the microstructure of an associated AM part being locally altered, and/or can change a relationship between AM processing parameters and microstructure that facilitates improvements in microstructure. In some implementations, such approaches for improving surface hardness can allow for increased build speeds (e.g., due to associated changes in processing parameters) or other related benefits.

For instance, a potential benefit of locally altering surface tension would be to allow for faster build rates in the interior of a part while maintaining a smaller weld pool near the part's exterior, which can provide for formation of finer (e.g., exterior) features. As two examples, titanium oxide and sulfur are known to change surface tension of stainless steels, and can be used to alter weld pools to achieve, at least the benefits noted above.

Locally altering surface hardness can be beneficial in a number of ways. For instance, traditional surface hardening approaches (e.g., carburization/nitriding) can be of limited use (e.g., for parts with complex geometries), as they harden all exposed surfaces and/or are limited to treating accessible (e.g., external and/or easily accessible) surfaces. Using the approaches described herein, material properties in an AM part can be locally altered to selectively increase surface hardness, regardless of whether the hardened surface is external or internal to the AM part, or is difficult to access to perform traditional surface treatment.

In AM parts for various applications, there can be internal or hard to reach surfaces that can benefit from additional hardness. For instance, some examples of surfaces that can benefit from locally increased surface hardness are passageways in valves and airfoils, which have particulate matter that flows through them when in use. Accordingly, locally increasing surface hardness of such surfaces using the approached described herein can increase resistance to damage that can result from such particulate matter. Accordingly, such implementations can be useful for producing AM parts for use in, e.g., gas and mining industries, as well as other applications.

In some implementations, the AM techniques for spatially (locally) tailoring material composition and/or material properties described herein can also be used in conjunction with existing surface treatment techniques, which can further improve spatial material composition and property control. For example, surface coatings could be applied with the disclosed techniques in a laser welding application, which can adjust (alter) a depth of an associated weld pool, which can improve bonding quality. In some implementations, surface treatments can be printed (applied, etc.) before laser surfacing, which can enhance surface hardness in specific locations, or can spatially vary the degree of surface hardness enhancement. Such approaches could be used to provide for grading of material properties, so as to reduce stresses that can occur due to sharp transitions in material properties, such as surface hardness. Such approaches can also provide for greater control over material properties than can be obtained by simply blowing reactive materials onto a surface of an AM part.

In some implementations, a deposited dopant material could act as a binding agent for the powder. For instance, such a binding agent can hold (bind, etc.) the powder together, even where powder bed feedstock metal is not fused. Such implementations could be used to create high porosity regions on the edges of fused material, which would be useful for producing AM parts used in applications such as filters, heat exchangers, and catalysts supports that require high surface area and/or porosity. In some implementations, the bound (and doped) powder feedstock material could be densified, e.g., through post-processing methods, such as sintering or infiltration, e.g., as used in BJ processes. In such implementations, laser processing could provide added benefits, such as for forming high strength regions that resist slumping during sintering.

In some implementations, a dopant that includes a sintering aid could be printed on, and locally incorporated into the material of an AM part. Such a sintering aid could lower the melting point of associated power feedstock material and, in implementations including a laser fusing operation, can locally alter densification characteristics of the material including the dopant. Such approaches can be used, for example, in BJ processes, where a sintering aid dopant can be used to enhance densification in particular regions of the powder (e.g., when a green part is sintered or fused).

In some implementations, the various example applications and approaches described herein can be integrated in different ways. For instance, a series of different materials could be deposited (e.g., on a powder bed layer) in order to achieve interacting, and/or overlapping benefits at a same location, at multiple locations, and/or at different locations (regions, portions, etc.) of an AM part.

In some implementations, AM can be used to produce a part (integrated component, integrated assembly, etc.) that integrates multiple parts of a component produced using traditional approaches into a single component. Such integration can allow for reduction (cost, time) in component assembly operations and, in some implementations, can improve performance as compared to a corresponding multi-part component. However, in some applications, as a result of integrating separate parts of a traditional assembly into a single AM part, the resulting AM part can suffer from increased vibration as compared to a corresponding multi-part assembly, where the inter-part connections can provide vibration damping. Using the approaches described herein, doping can be used to locally create second phases in the material (e.g., at the integration points) that can enhance vibration damping (e.g., reduce vibration) in the integrated AM part (component). For instance, such reductions in vibration can be accomplished in steel AM parts by locally adding (doping with) carbon, to result in graphite being locally incorporated in the AM part at areas that are susceptible to vibration, or causing vibration.

In implementing the AM techniques described herein, one consideration can be the selection of particular solvents/and or liquid dopant carrier that will reduce contamination of the powder feedstock, such as powder that is not fused in the AM process (e.g., to allow for recycling of the powder feedstock). As discussed above, a shroud (or other such apparatus) can be used to confine solvents, carriers, and decomposition products given off by the materials to a smaller area that can be more readily purged. Such approaches maintain atmospheric purity in laser PBF processes, where powder bed purity is important for at least the reasons discussed herein.

Such decomposition products can be given off as a result of heating the powder bed layer after liquid deposition (including desired dopants) has occurred. Such heating could be performed to cause evaporation of volatile compounds, decomposition of materials such as salts or organometallics, and/or to remove unwanted materials. Considering the solvent or carriers used, as well as using a shroud, or the like, to facilitate purging the unwanted materials, can help maintain powder feedstock purity. Such evaporation can also be performed to adjust an amount of deposited material, such as by evaporating excess (unwanted) quantities of the materials.

Using the approaches described herein for locally tailoring material composition and/or material properties can allow for producing AM parts with better mechanical performance than can be achieved by like AM parts produced using uniform material compositions. The use of tailored material compositions in conjunction with variation of AM process parameters variation (e.g., energy beam power, beam size, scan speed, stepover, etc.) can provide sufficient design freedom to create effective spatial material composition and/or property tuning, which can control defect propagation in high stress regions associated with certain geometries, as well processing defects. Further, the techniques for locally tailoring material composition and/or properties can increase defect tolerance of AM components, so as to facilitate higher reliability and increased process yield.

Following is a discussion of general aspects that can be implemented, at least, using the approaches described herein. In a first general aspect, a method for additive manufacturing can include depositing a liquid on a first portion of an article, the liquid containing a dopant, the article including a feedstock material. The method can also include heating, at a first temperature, the article to, at least one of, evaporate or decompose the liquid. The heating at the first temperature can leaving the dopant on the first portion of the article. The method can further include heating, at a second temperature, the article. The heating at the second temperature can result in the feedstock material melting and the dopant mixing with the feedstock material in a second portion of the article. The second portion of the article can include the first portion of the article.

Example implementations can include one or more of the following features. For example, depositing the liquid can include depositing the liquid on a previously fused portion of a powder layer of the feedstock material included in the article. The method can include, after the heating at the first temperature and prior to the heating at the second temperature, forming a powder layer of the feedstock material on at least the first portion of the article. Depositing the liquid can include depositing the liquid on a powder layer of the feedstock material. The deposited liquid can be distributed in pores of the powder layer in the first portion of the article.

Heating at the first temperature can include at least one of heating a build chamber in which the article is disposed, scanning the article with an energy beam, and/or projecting a patterned thermal image on the article. Heating at the second temperature can include scanning the article with an energy beam. The energy beam can be one of a laser, or an electron-beam.

The liquid can be a first liquid and the dopant can be a first dopant. The method can include, prior to the heating at the first temperature, depositing a second liquid on a second portion of the article. The second liquid can contain a second dopant. The second dopant can be different than the first dopant. The second portion of the article can be one of: a portion of the article that is non-overlapping with the first portion of the article; a portion of the article that is partially overlapping with the first portion of the article; or a same portion of the article as the first portion of the article.

The liquid can be a first liquid, and the method can include, after heating at the first temperature, and prior to heating at the second temperature, depositing a second liquid including the dopant on the first portion of the article. The method can include, again heating the article at the first temperature to evaporate or decompose the second liquid, so as to increase a concentration of the dopant on the first portion of the article.

The feedstock material can be one of a metal, a ceramic, or a polymer.

The method can further include, during the heating at the first temperature, removing evaporated portions of the liquid from a build chamber in which the article is disposed.

In another general aspect, a method for additive manufacturing can include depositing a liquid on a first portion of an article, the liquid containing a dopant, the article including a feedstock material. The method can also include heating the first portion of the article with a projected thermal image to, at least one of, evaporate or decompose the liquid. The projected thermal image can create a range of temperatures between a first temperature and a second temperature. The heating of the first portion of the article can result in a graded concentration of the dopant in the first portion of the article. The method can further include heating, at a third temperature, the article. The heating at the third temperature can result in a portion of the feedstock material melting and the dopant mixing with the portion of the feedstock material in a second portion of the article. The second portion of the article can include the first portion of the article.

Example implementations can include one or more of the following features. For example, the second temperature can be greater than the first temperature, A concentration of the dopant can be higher in the first portion of the article where the second temperature of the projected thermal image is applied than a concentration of the dopant in the first portion of the article where the first temperature of the projected thermal image is applied.

The liquid can be a first liquid, and the dopant can be a first dopant. The method can include, prior to the heating the first portion of the article with the projected thermal image, depositing a second liquid on a second portion of the article. The second liquid can contain a second dopant. The second dopant can be different than the first dopant. The method can include heating the second portion of the article with the projected thermal image.

The second portion of the article can be one of: a portion of the article that is non-overlapping with the first portion of the article; a portion of the article that is partially overlapping with the first portion of the article; or a same portion of the article as the first portion of the article.

In another general aspect, an additive manufacturing system can include a build chamber configured to receive feedstock material used to produce an article. The system can also include a feedstock material source configured to provide the feedstock material to the build chamber. The system can further include a dopant printing system configured to selectively deposit a dopant containing liquid on the article during manufacturing. The system can also include a first heat source configured to, at least one of, evaporate or decompose the dopant containing liquid, such that the dopant remains on the article in a pattern corresponding with the selective deposition. The system can still further include a second heat source, configured to melt a portion of the feedstock material, such that the dopant is locally dispersed in the article.

Example implementations can include one or more of the following features. For example, the system can include a shroud configured to remove evaporated portions of the liquid from the build chamber.

The dopant printing system can includes at least one of an inkjet printhead, an aerosoljet, a syringe pump, and/or a spray nozzle.

In the foregoing disclosure, it will be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method for additive manufacturing, the method comprising:

depositing a liquid on a first portion of an article, the liquid including a dopant, the article including a feedstock material;

heating, at a first temperature, the article to, at least one of, evaporate or decompose the liquid, the heating at the first temperature leaving the dopant on the first portion of the article; and after heating at the first temperature:

heating, at a second temperature different than the first temperature, the article, the heating at the second temperature resulting in a portion of the feedstock material melting and the dopant mixing with the portion of the feedstock material in a second portion of the article, the second portion of the article including the first portion of the article.

2. The method of claim 1, wherein the depositing the liquid includes depositing the liquid on a previously fused portion of a powder layer of the feedstock material included in the article.

3. The method of claim 2, further comprising, after the heating at the first temperature and prior to the heating at the second temperature, forming a powder layer of the feedstock material on at least the first portion of the article.

4. The method of claim 1, wherein the depositing the liquid includes depositing the liquid on a powder layer of the feedstock material.

5. The method of claim 4, wherein the deposited liquid is distributed in pores of the powder layer in the first portion of the article.

6. The method of claim 1, wherein the heating at the first temperature includes at least one of:
heating a build chamber in which the article is disposed;
scanning the article with an energy beam;
shining at least one light onto the article; or
projecting a patterned thermal image on the article.

7. The method of claim 1, wherein the heating at the second temperature includes scanning the article with an energy beam.

8. The method of claim 7, wherein the energy beam is one of:
a laser; or
an electron-beam.

9. The method of claim 1, wherein the liquid is a first liquid and the dopant is a first dopant, the method further comprising, prior to the heating at the first temperature:
depositing a second liquid on a second portion of the article, the second liquid containing a second dopant, the second dopant being different than the first dopant.

10. The method of claim 9, wherein the second portion of the article is one of:
a portion of the article that is non-overlapping with the first portion of the article;
a portion of the article that is partially overlapping with the first portion of the article; or
a same portion of the article as the first portion of the article.

11. The method of claim 1, wherein the liquid is a first liquid, and the method further comprises, after heating at the first temperature, and prior to heating at the second temperature:
depositing a second liquid including the dopant on the first portion of the article; and
again heating the article at the first temperature to evaporate or decompose the second liquid, so as to increase a concentration of the dopant on the first portion of the article.

12. The method of claim 1, wherein the feedstock material is one of:
a metal;
a ceramic; or
a polymer.

13. The method of claim 1, further comprising, during the heating at the first temperature, removing evaporated portions of the liquid from a build chamber in which the article is disposed.

14. A method for additive manufacturing, the method comprising:
depositing a liquid on a first portion of an article, the liquid including a dopant, the article including a feedstock material;
heating the first portion of the article with one or more thermal energy sources to, at least one of, evaporate or decompose the liquid, wherein the heating the first portion of the article creates a range of temperatures between a first temperature and a second temperature, the heating the first portion of the article resulting in a graded concentration of the dopant in the first portion of the article; and
after heating the first portion of the article with the one or more thermal energy sources:
heating, at a third temperature different than the first temperature and the second temperature, the article, the heating at the third temperature resulting in a portion of the feedstock material melting and the dopant mixing with the feedstock material in a second portion of the article, the second portion of the article including the first portion of the article.

15. The method of claim 14, wherein the second temperature is greater than the first temperature, a concentration of the dopant in the first portion of the article where the second temperature is applied being higher than a concentration of the dopant in the first portion of the article where the first temperature is applied.

16. The method of claim 15, wherein the liquid is a first liquid and the dopant is a first dopant, the method further comprising, prior to the heating the first portion of the article with the one or more thermal energy sources:
depositing a second liquid on a second portion of the article, the second liquid containing a second dopant, the second dopant being different than the first dopant, the method further comprising:
heating the second portion of the article with the one or more thermal energy sources.

17. The method of claim 16, wherein the second portion of the article is one of:
a portion of the article that is non-overlapping with the first portion of the article;
a portion of the article that is partially overlapping with the first portion of the article; or
a same portion of the article as the first portion of the article.

18. An additive manufacturing system comprising:
a build chamber configured to receive feedstock material used to produce an article;
a feedstock material source configured to provide the feedstock material to the build chamber;
a dopant printing system configured to selectively deposit a dopant containing liquid on the article during manufacturing;
a first heat source configured to heat the article to a first temperature to, at least one of, evaporate or decompose the dopant containing liquid, such that the dopant remains on the article in a pattern corresponding with the selective deposition; and
a second heat source, configured to, after heating the article to the first temperature, heat the article to a second temperature different than the first temperature to fuse the feedstock material, such that the patterned dopant is locally dispersed in the article.

19. The additive manufacturing system of claim 18, further comprising:
a shroud configured to remove evaporated portions of the liquid from the build chamber.

20. The additive manufacturing system of claim 18, wherein the dopant printing system includes at least one of:
an inkjet printhead;
an aerosoljet;
a syringe pump; or
a spray nozzle.

21. The additive manufacturing system of claim 18, wherein fusing the feedstock material includes at least one of melting the feedstock material or sintering the feedstock material.

* * * * *